US009141702B2

(12) United States Patent
Kasterstein et al.

(10) Patent No.: US 9,141,702 B2
(45) Date of Patent: Sep. 22, 2015

(54) METHOD FOR DYNAMICALLY DISPLAYING A PERSONALIZED HOME SCREEN ON A DEVICE

(71) Applicant: Doat Media Ltd., Tel Aviv (IL)

(72) Inventors: Rami Kasterstein, Givataim (IL); Amihay Ben-David, London (GB); Joey Joseph Simhon, Ramat-Gan (IL)

(73) Assignee: Doat Media Ltd., Tel Aviv (IL)

( * ) Notice: Subject to any disclaimer, the term of this patent is extended or adjusted under 35 U.S.C. 154(b) by 92 days.

(21) Appl. No.: 13/712,563

(22) Filed: Dec. 12, 2012

(65) Prior Publication Data

US 2013/0103665 A1  Apr. 25, 2013

Related U.S. Application Data

(63) Continuation-in-part of application No. 13/156,999, filed on Jun. 9, 2011, and a continuation-in-part of application No. 13/296,619, filed on Nov. 15, 2011.

(60) Provisional application No. 61/653,562, filed on May 31, 2012, provisional application No. 61/468,095, filed on Mar. 28, 2011, provisional application No. 61/354,022, filed on Jun. 11, 2010.

(51) Int. Cl.
*G06F 17/30* (2006.01)

(52) U.S. Cl.
CPC .... *G06F 17/30864* (2013.01); *G06F 17/30716* (2013.01); *G06F 17/30867* (2013.01)

(58) Field of Classification Search
CPC .......... G06F 17/3089; G06F 17/30554; G06F 17/30038; G06F 17/30041; G06F 17/30528; G06F 3/048; G06F 3/0481; G06F 17/30864; G06F 17/30867; G06F 17/30716

USPC ......................................................... 707/706
See application file for complete search history.

(56) References Cited

U.S. PATENT DOCUMENTS 5,911,043 A  6/1999  Duffy et al.
6,101,529 A  8/2000  Chrabaszcz
(Continued)

FOREIGN PATENT DOCUMENTS

KR  20030069127  8/2003
KR  20070014595  2/2007
(Continued)

OTHER PUBLICATIONS

International Searching Authority: International Search Report including "Written Opinion of the International Searching Authority" (PCT Rule 43bis.1) for the related International Patent Application No. PCT/US2011/039808; Date of Mailing: Feb. 9, 2012.
(Continued)

*Primary Examiner* — Jean B Fleurantin
*Assistant Examiner* — Evan Aspinwall
(74) *Attorney, Agent, or Firm* — M&B IP Analysts, LLC (57) ABSTRACT

A method for dynamically generating and displaying a home screen on a display of a user device comprises receiving a user query input by a user of the device; receiving at least one environmental variable; determining an intent of a user based in part on the at least one environmental variable and the user query; selecting at least one resource of information from a plurality of resources of information respective of at least the intent, wherein each selected resource has a representative icon; generating a new home screen comprising an at least one icon corresponding to the at least one selected resource of information; and causing the user device to replace a current home screen with the new generated home screen.

15 Claims, 6 Drawing Sheets

(56) References Cited

U.S. PATENT DOCUMENTS

| | | |
|---|---|---|
| 6,484,162 B1 | 11/2002 | Edlund et al. |
| 6,564,213 B1 | 5/2003 | Ortega et al. |
| 7,266,588 B2 | 9/2007 | Oku |
| 7,302,272 B2 | 11/2007 | Ackley |
| 7,376,594 B2 | 5/2008 | Nigrin |
| 7,533,084 B2 | 5/2009 | Holloway et al. |
| 7,565,383 B2 | 7/2009 | Gebhart et al. |
| 7,599,925 B2 | 10/2009 | Larson et al. |
| 7,636,900 B2 | 12/2009 | Xia |
| 7,774,003 B1 * | 8/2010 | Ortega et al. ............. 455/456.2 |
| 7,797,298 B2 | 9/2010 | Sareen et al. |
| 7,958,141 B2 | 6/2011 | Sundaresan et al. |
| 8,032,666 B2 | 10/2011 | Srinivansan et al. |
| 8,086,604 B2 | 12/2011 | Arrouye et al. |
| 8,271,333 B1 | 9/2012 | Grigsby et al. |
| 8,312,484 B1 | 11/2012 | McCarty et al. |
| 8,571,538 B2 | 10/2013 | Sprigg et al. |
| 8,718,633 B2 | 5/2014 | Sprigg et al. |
| 2004/0186989 A1 | 9/2004 | Clapper |
| 2005/0076367 A1 | 4/2005 | Johnson et al. |
| 2005/0102407 A1 | 5/2005 | Clapper |
| 2005/0283468 A1 | 12/2005 | Kamvar et al. |
| 2006/0031529 A1 | 2/2006 | Keith |
| 2006/0206803 A1 | 9/2006 | Smith |
| 2006/0248062 A1 | 11/2006 | Libes |
| 2006/0277167 A1 | 12/2006 | Gross et al. |
| 2007/0082707 A1 * | 4/2007 | Flynt et al. ............. 455/564 |
| 2007/0112739 A1 | 5/2007 | Burns et al. |
| 2007/0174900 A1 | 7/2007 | Marueli et al. |
| 2007/0204039 A1 | 8/2007 | Inamdar |
| 2008/0077883 A1 | 3/2008 | Kim et al. |
| 2008/0256443 A1 | 10/2008 | Li et al. |
| 2008/0306937 A1 | 12/2008 | Whilte et al. |
| 2009/0049052 A1 | 2/2009 | Sharma et al. |
| 2009/0210403 A1 | 8/2009 | Reinshmidt et al. |
| 2009/0234811 A1 | 9/2009 | Jamil et al. |
| 2009/0234814 A1 * | 9/2009 | Boerries et al. ............. 707/3 |
| 2009/0239587 A1 | 9/2009 | Negron et al. |
| 2009/0277322 A1 | 11/2009 | Cai et al. |
| 2010/0030753 A1 | 2/2010 | Nad et al. |
| 2010/0042912 A1 | 2/2010 | Whitaker |
| 2010/0082661 A1 | 4/2010 | Beaudreau |
| 2010/0094854 A1 | 4/2010 | Rouhani-Kalleh |
| 2010/0162183 A1 | 6/2010 | Crolley |
| 2011/0047510 A1 | 2/2011 | Yoon |
| 2011/0078767 A1 | 3/2011 | Cai et al. |
| 2011/0093488 A1 | 4/2011 | Amacker et al. |
| 2011/0131205 A1 | 6/2011 | Iyer et al. |
| 2011/0314419 A1 | 12/2011 | Dunn et al. |

FOREIGN PATENT DOCUMENTS

| | | |
|---|---|---|
| KR | 20110009955 | 1/2011 |
| WO | 2007047464 | 4/2007 |
| WO | 2009117582 | 9/2009 |
| WO | 2010014954 | 2/2010 |
| WO | 2011016665 | 2/2011 |

OTHER PUBLICATIONS

International Search Authority: "Written Opinion of the International Searching Authority" (PCT Rule 43bis.1) including International Search Report for International Patent Application No. PCT/US2012/059548; Date of Mailing Mar. 26, 2013.

International Search Authority: "Written Opinion of the International Searching Authority" (PCT Rule 43bis.1) including International Search Report for corresponding International Patent Application No. PCT/US2012/069250; Date of Mailing: Mar. 29, 2013.

* cited by examiner

METHOD FOR DYNAMICALLY DISPLAYING A PERSONALIZED HOME SCREEN ON A DEVICE

CROSS REFERENCE TO RELATED APPLICATIONS

This application claims the benefit of U.S. provisional patent application No. 61/653,562, filed on May 31, 2012. This application is also a continuation-in-part application of U.S. patent application Ser. No. 13/156,999 filed on Jun. 9, 2011 which claims the benefit of U.S. provisional patent application No. 61/468,095 filed Mar. 28, 2011 and U.S. provisional application No. 61/354,022, filed Jun. 11, 2010. This application is also a continuation-in-part application of U.S. patent application Ser. No. 13/296,619 filed on Nov. 15, 2011. The contents of the above-referenced applications are incorporated herein by reference.

TECHNICAL FIELD

The invention generally relates to display of a home screen on a display device, and more specifically to the dynamic display of home screens for devices having a display.

BACKGROUND

In general, home screens are used to navigate through the content of a user's devices such as mobile devices, tablet computers, laptop computers, etc. Navigation through the home screen might be carried out by pressing navigation keys on the device or by manipulating other input devices typically associated with a device, such as a touch screen placed over the device's display. The home screen usually includes a plurality of icons that are static in nature and sometimes are moved from one static display of icons to another by the user. Furthermore, in mobile devices, such as smart phones and tablet computers, the display area is quite limited compared to the display screens typically used by desktop and laptop computer systems.

On mobile devices, the home screen typically operates as a default browser displaying static data in order to fit the variety of data streaming to and from the mobile device. The home screen typically includes icons associated with applications (e.g., a browser, a mobile application or app, etc.), as well as icons associated with documents, files, and so on. The icons are arranged according to users' preferences, but once they are set, the home screen typically cannot be dynamically changed to display a different set of icons not previously configured by the user.

It would be therefore advantageous to provide a solution that overcomes the limitations of the prior art.

SUMMARY

Certain embodiments of the invention include a method for dynamically generating and displaying a home screen on a display of a user device. The method comprises receiving at least one environmental variable; determining an intent of a user based in part on the at least one environmental variable and the user query; selecting at least one resource of information from a plurality of resources of information respective of at least the intent, wherein each selected resource has a representative icon; generating a new home screen comprising at least one icon corresponding to the at least one selected resource of information; and causing the user device to replace a current home screen with the new generated home screen.

Certain embodiments of the invention also include a method for dynamically generating and displaying a home screen on a display of a user device. The method comprises receiving at least one environmental variable; determining an intent of a user based in part on the at least one environmental variable; selecting at least one resource of information from a plurality of resources of information respective of at least the intent, wherein each selected resource has a representative icon; generating a new home screen comprising an at least one icon corresponding to the at least one selected resource of information; and causing the user device to replace a current home screen with the new generated home screen.

Certain embodiments of the invention also include an apparatus for dynamically generating and displaying a home screen on a display of a user device. The apparatus comprises an interface to a network to communicate with at least the user device and a plurality of systems configured to provide environmental variables and personal variables, and to a plurality of resources of information; an analyzer configured to receive at least one environmental variable and to determine an intent of a user based in part on the at least one environmental variable; a selection unit configured to select at least one resource of information from the plurality of resources of information respective of at least the intent, wherein each selected resource has a representative icon; and an output unit for generating a new home screen including at least one icon corresponding to the at least one selected resource of information, wherein the output unit is further configured to cause the user device to replace a current home screen with the new generated home screen.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

The various embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In certain exemplary embodiments disclosed herein, a system and method for displaying a personalized dynamic home screen on a device are provided. The system determines an intent based on a query input, one or more environmental variables, or one or more personal variables. The intent represents the type of content, the content, and/or actions that may be of an interest to the user for a current time period. Respective of the intent, the system selects one or more resources of information responsive of the query and displays them on the home screen of the device.

In one embodiment, the system displays an image as a wallpaper on the home screen of the device respective of the intent. In another embodiment, the system may be implemented within an application installed on the device or as part of the device's operating system. The system continuously tracks the environmental or personal variables of the user and upon identification of a change in the intent, and then the system updates the home screen of the device.

Figure 1:
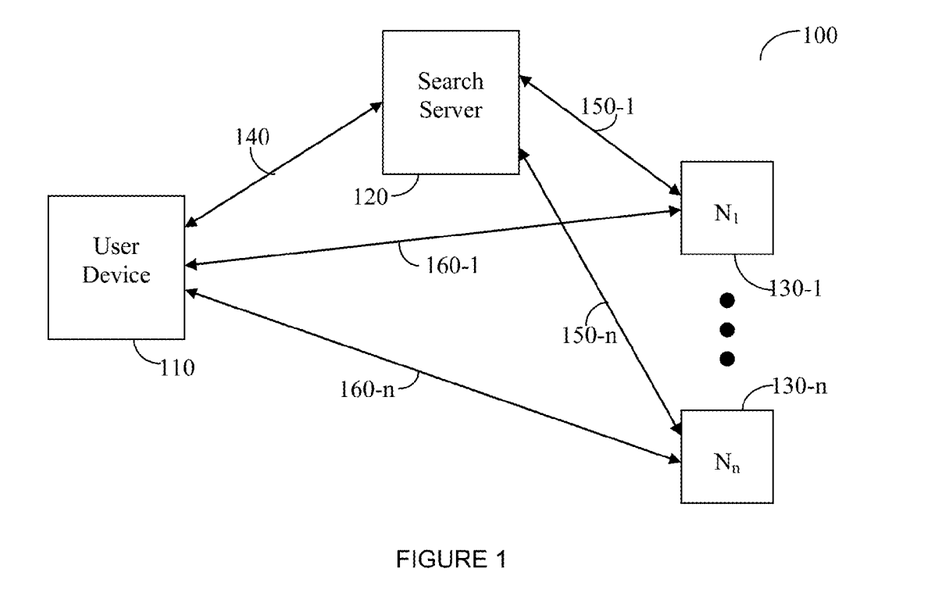
FIG. 1 is a schematic diagram of the operation of the system in accordance with one embodiment.

FIG. 1 depicts an exemplary and non-limiting schematic diagram of a system 100 utilized for describing certain embodiments disclosed herein. A user device 110 submits over a communication link 140 a query to a search server 120. The search server 120 is also configured to receive a plurality of environmental variables. Such variables may include, but are not limited to, search history, time of day, social friends, location, motion information, weather information, sounds, images, sentiment inputs received by the user, and more. The environmental variables may be received from databases (not shown) connected to the search server 120, and from the user device 110. For example, location information can be received by a GPS in the user device 110, while social friends may be received from a database of a social media website. In addition, personal variables, such as a user profile, demographic information related to the user, and so on, can be retrieved by the search server 120 and be utilized to determine the user's intent. The search server 120 determines the user's intent based on the received variables. With this aim, according to an exemplary embodiment, the search server 120 analyzes the context of each variable and correlates the analyzed variable to derive at least a category of interest. The correlation is performed based on the context of the analyzed variables.

In another embodiment, the search server 120 is configured to determine the intent respective of a query or part of a query received from the user and at least one environmental variable (and if provided a personal variable). The search server 120 processes the input query and the received variables to determine the intent. With this aim, according to an exemplary embodiment, the search server 120 analyzes the context of the query and each received variable and correlates the analyzed variables with the query to derive at least a category of interest. The correlation is performed based on the context of the analyzed variables and query. As an example, the search server 120 receives the query "Madonna". The search server 120 further receives by a GPS in the user device 110 information that the user is located, for example, at the Brooklyn Museum. The query is then analyzed by the search server 120 and together with the user's location it is associated with an art category. Respective thereto, the user intent is determined as "art" related.

Once the intent is determined, the search server 120 selects resources from a plurality of resources 130-1 through 130-n that are the most appropriate to fulfill the user's intent. The resources 130 include, but are not limited to, a plurality of web search engines, servers of content providers, vertical comparison engines, servers of content publishers, and so on. The resources 130 may include "cloud-based" applications, that is, applications executed by servers in a cloud-computing infrastructure, such as, but not limited to, a private-cloud, a public-cloud, or any combination thereof. The cloud-computing infrastructure is typically realized through a data center. Although not shown in FIG. 1, the resources 130 may further include mobile applications (also known as apps) and/or widgets currently installed on the user device 110.

The resources 130 may be further arranged according to different categories. For example, if the query term is "Hector Berlioz" then it is most likely that the best answers will be from resources that are capable of handling classical music queries.

In an embodiment, the search server 120 is configured to determine which resources 130 would be the most appropriate resource(s) 130 to address the intent. With this aim, the resources 130 are categorized according to topics of interest, such as "music" or "carpentry tools". The topics of interest are set, for example, by the content provided. The resources 130 are further categorized according to demographic information (i.e., to which demographic group a certain resource may be of interest). The resources 130 may also be registered according to certain keywords. To determine the appropriate resource(s) 130, the search server 120 matches the intent to resources based on the category of each resource. For example, if the intent is "building a bookcase", then resources categorized with topic of interest "carpentry tools" will be selected. Moreover, as will be described herein below, the search server 120 may monitor the corresponding use by the user on the user device 110 to determine which of the resources 130 were the most appropriate for the user, thereby influencing future references provided from that resource.

The search server 120 further provides a display area containing display segments unique to each of the selected resources 130, which have been determined to be appropriate to address the user's intent. The selected resources communicate directly with their respective display segments on the user device over the communication links 160. The display area may be an application in its own right, such as, but not limited to, a web browser.

In one embodiment, and as further explained herein below, only a portion of the selected resources of the resources 130 are designated with a display segment. Those selected resources that do not have an allocation of a display segment are approached when the user requests, for example, information from additional selected resources. By mere example, there may be thirty selected resources, but the display area may be designed to contain only ten display segments; therefore only the top ten of the selected resources are associated with the display segment. The other selected resources can be associated with the display segment upon a subsequent request for more information made by the user and as further explained below. As a result, it is not necessary for the search server 120 to have any specific information or data regarding the actual content residing on the resource. The only ability needed is to determine which resource of the resources 130 is appropriate to provide a certain answer to the user's intent, thereby potentially becoming a resource trusted by a user of the device 110.

According to certain embodiments, the search server 120 generates a query respective of the determined intent, or variations thereof, to a resource in a communication format that is proper for that specific resource, thereby enabling search of such resources that require a customized interface to perform any kind of successful processing. The communication links 140, 150, and 160 may occur over a common network such as, but not limited to, a local area network (LAN), a wide area network (WAN), a metro area network (MAN), the world wide web (WWW), the Internet, a wired network, a wireless network, and the like, as well as any combination thereof. The various elements of the system 100 are further described in co-pending US patent application Ser. No. 13/156,999 filed on Jun. 9, 2011 to Kasterstein, et al., titled "SYSTEM AND METHODS THEREOF FOR ENHANCING A USER's SEARCH EXPERIENCE", assigned to common assignee, and which is hereby incorporated by reference for all that it contains.

Figure 2:
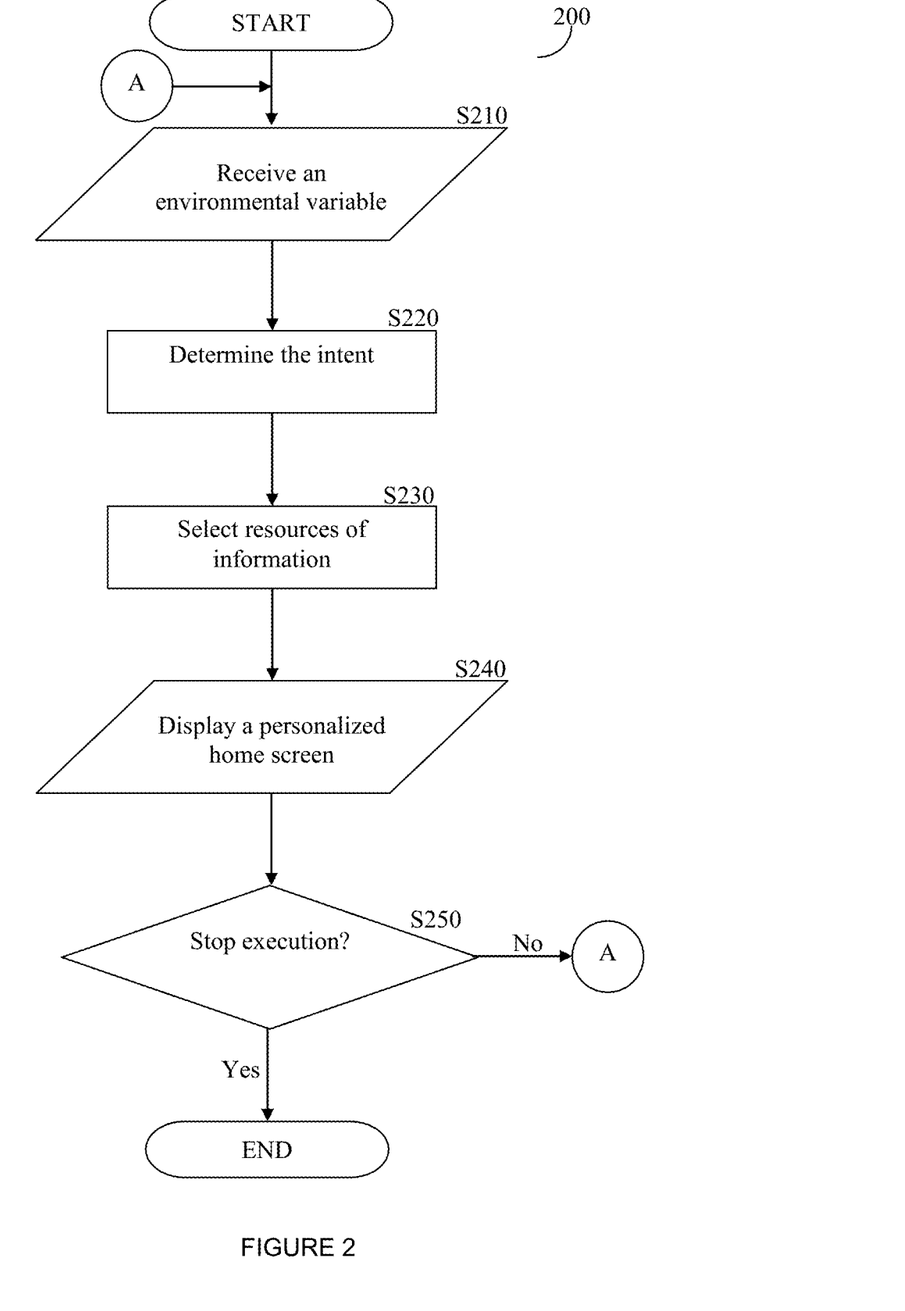
FIG. 2 is a flowchart describing the operation of displaying a dynamic home screen on a device according to one embodiment.

FIG. 2 depicts an exemplary and non-limiting flowchart 200 of a method for generating and displaying a dynamic home screen over a user's device according to one embodiment. In S210, at least one environmental variable is received at the search server 120. An environmental variable may be, for example and not by way of limitation, the location of the user mobile device, the device rate of motion, time of day, and more. In one embodiment, the search server 120 may be preconfigured to include a set of variables defined by the system or by the user. For example, "home" means the physical location of the user's home, whereas "morning" could mean any time between 6 am to 10 am.

Optionally, the search server 120 may also retrieve or receive one or more personal variables associated with the user. As mentioned above, such variables may include, but are not limited to, a user profile, demographic information, user's preferences, and so on. Such variables may be retrieved or received from systems and databases that generate and/or maintain the variables.

In S220, based on the received variables, the intent of the user is determined. The received variables include at least one environmental variable and optional one or more personal variables. The intent may represent the type of content, the content, and/or actions that may be of an interest to the user at a current time period. In one embodiment, the intent is determined by monitoring at least the received environmental variables (or variables determined by the users to be monitored) to determine any changes in the variables that may in turn change the intent. Then, the changed environmental variables are analyzed to determine the current (updated) intent of the user. The changed environmental variables may be further correlated with the personal variables.

For example, if the time is 8 am on Monday and the user's device location is the user's home, then the intent may be related to "review news" or "review emails". If the location changes to away-from-home, and the GPS information indicates the user is driving, the intent may be changed to receiving traffic updates or listening to the user's favorite radio station during the user's commute. As another example, if the device's motion is determined to be at a rate of a person walking, and the location is determined as 5$^{th}$ Avenue in New York City, the user intent may be "nearby shopping stores."

In S230, one or more resources of information (e.g., resources 130) related to the determined intent are selected. For example, if the intent is "review news" (as discussed above), then the selected resources may be one or more news websites or apps (mobile applications) that the user usually reviews. The favorite news websites or apps may be determined, for example, based on a different environmental variable, (e.g., search/browsing history) and/or a personal variable (e.g., a user profile).

In S240, a personalized home screen respective of the selected resources is generated to be displayed on the user's device. Each selected resource is associated with an icon. An icon may be any type of graphical symbol rendered and displayed over the display on the user device. Clicking or tapping on the icon activates an app or provides a link to an information resource (e.g., news website), thereby providing the user with the desired information and/or action. In one embodiment, an icon included in the personalized home screen may be in a form of a widget or a gadget that can activate and/or provide a like to a respective selected resource. It should be noted that the widget or gadget is associated with a resource or information selected as described in detail above.

In S250, it is checked whether it is necessary to stop execution and if so, execution terminates; otherwise, execution continues with S210.

Figure 3:
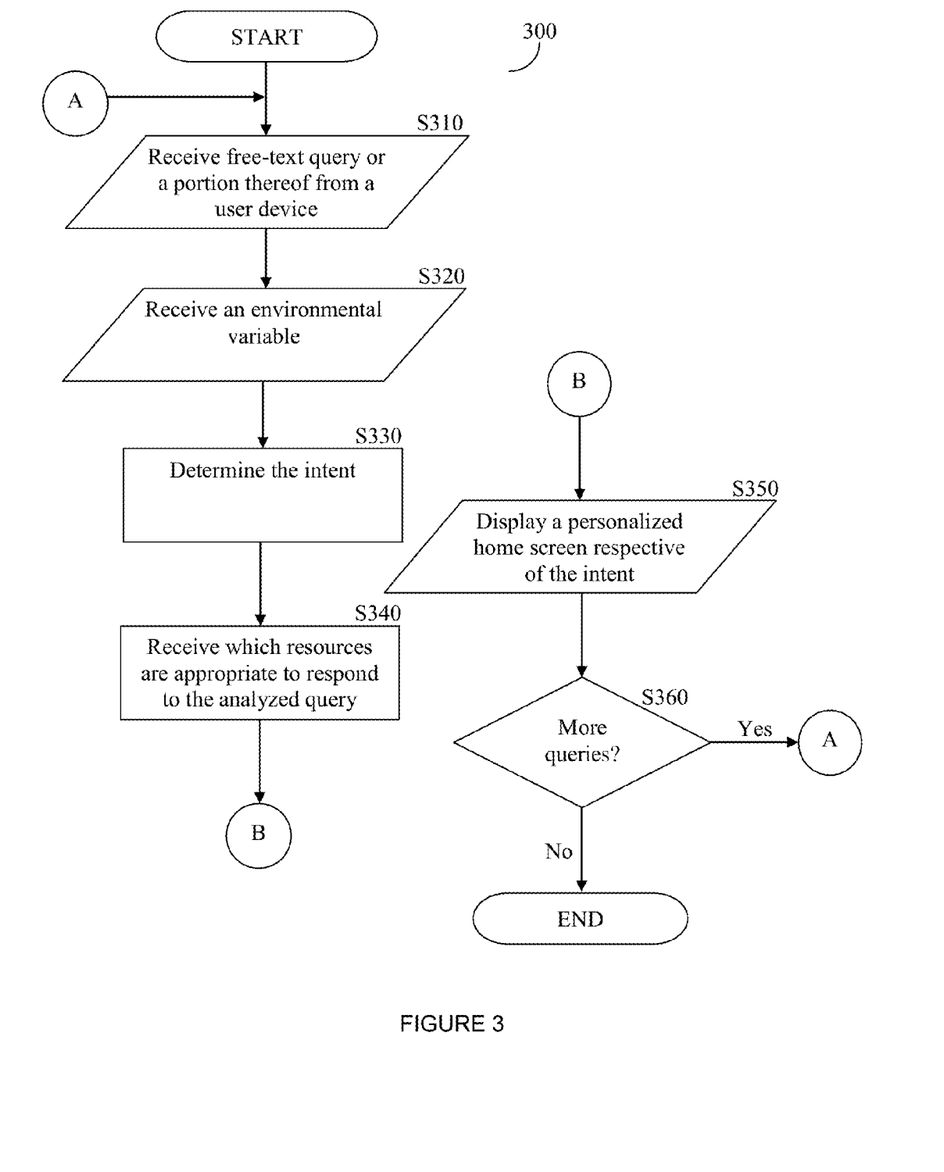
FIG. 3 is a flowchart describing the operation of displaying a dynamic home screen respective of an intent according to another embodiment.

FIG. 3 depicts an exemplary and non-limiting flowchart 300 describing a method for generating and displaying a dynamic home screen respective of a query or part of a query and at least one environmental variable, according to another embodiment. In S310, the search server 120 receives a query, such as a free-text query, or a portion thereof, from a user device, for example, a user device 110. The query may be, for example, a keyword, a portion of a keyword, a plurality of keywords, a character, a series of characters, and the like.

In one embodiment, the search server 120 is configured to auto-complete at least a portion of a query and suggest at least a query based on, for example, a user experience.

In S320, at least an environmental variable is received. In S330, the user's intent respective of the query is determined, based on, at least one environmental variable as described in detail above. The user intent can also be determined using one or more personal variables that may be correlated with the environmental variables.

In S340, a list of relevant resources from the plurality of resources 130-1 through 130-n is determined for the received query respective of the determined intent. In S360, a personalized home screen is generated to include the resources 130 determined to be relevant. The generated home screen is displayed over the user's device. As noted above the selected resource is associated with an icon on the generated home screen. An icon may be any type of graphical symbol rendered and displayed over the display of the user device. Clicking or tapping on the icon activates an app (mobile application) or provides a link to an information resource (e.g., news website), thereby providing the user with the desired information and/or action.

As noted above, in one embodiment, an icon included in the personalized home screen may be in a form of a widget or a gadget. It should be noted that the widget or gadget are associated with a resource of information selected as described in detail above.

Following are non-limiting examples for the operation of the method described with reference to FIG. 3. If the user often enters queries related to high-end brands, the search server 120 displays resources which are occasionally selected by other users who tend to search high-end brands. The search server 120 may further identify the time (given as an environmental variable) of the day the query is entered.

As another example, if the user enters the query term "eat" in the morning, the search server 120 would display results related to breakfast, and if the user enters the query term "eat" in the evening, the system displays responses related to dinner. As another example, if the environmental variable is the temperature at the user's location and the input query is "clothing", the search server 120 selects resources respective of the temperature and the term clothing. Examples for resources that may be displayed in response to the query term "clothing" and the environmental variable temperature indicating "winter season" are on-line stores that sell winter clothing. Again, the selected resources are displayed as icons on the home screen of the user's device 110.

In yet another example, the environmental variable is the state of motion of the device, indicating if the user is static or moving. The search server 120 selects resources and displays icons associated with the selected resources based on this identification and an input query. For instance, if the user enters the query term "Pizza" while moving, the search server 120 selects resources related to Pizza restaurants. If the user enters the query term "Pizza" while in a static mode, the server 120 displays resources related to Pizza deliveries. Again, the selected resources of information are displayed as icons on the home screen of the user's device, thereby the home screen is dynamically changed respective of the query and the corresponding variables.

In S370, it is checked whether there are additional queries to handle, and if so execution continues with S310; otherwise, execution terminates.

A person of ordinary skill in the art would readily appreciate that the operation of displaying a dynamic home screen as described in FIG. 2, and the operation of displaying a dynamic home screen respective of the intent of a query as described in FIG. 3, may be integrated without departing from the scope of the invention.

Figure 4:
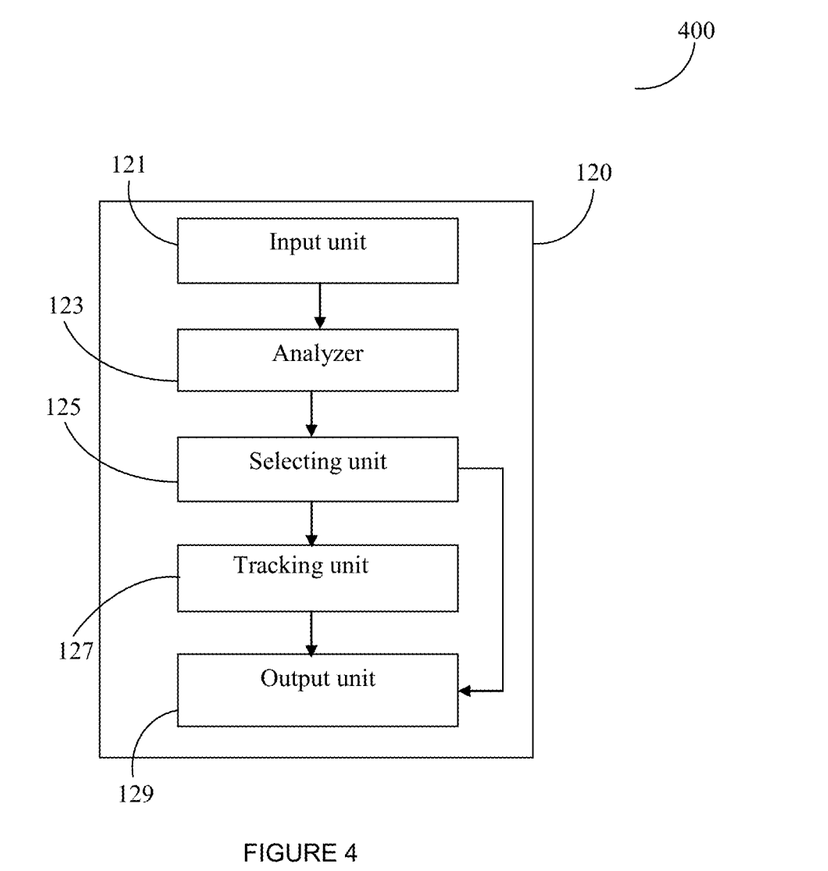
FIG. 4 is a schematic block diagram of the search server in accordance with one embodiment; and, FIGS. 5A and 5B are screenshots of a dynamic home screen of a device showing the operation of the system when the intent changes according to various embodiments disclosed herein.

FIG. 4 depicts an exemplary and non-limiting schematic diagram 400 of the search server 120. According to an exemplary embodiment, the search server 120 includes an input unit 121 for receiving queries from the user's device 110. Through the input unit 121, a plurality of environmental variables is also received. The search server 120 also includes an analyzer 123, a selection unit 125, a tracking unit 127, and an output unit 129. Each of the units may include a processor coupled to a memory (both are not shown).

The analyzer 123 determines the user's intent based one or more environmental variables and in some case using personal variables as discussed in detail above. The analyzer 123 can also determine the intent respective of an input query as discussed above. The selection unit 125 selects at least one resource from a plurality of resources of information respective of the intent and extracts at least an icon or a widget respective of each selected resource. The tracking unit 127 continuously tracks changes of the at least an environmental variable and updates the home screen respective of the changes. The output unit 129 generates a new home screen that includes the extracted icons and causes the device to replace a current home screen with the newly-generated home screen.

Figure 5A:
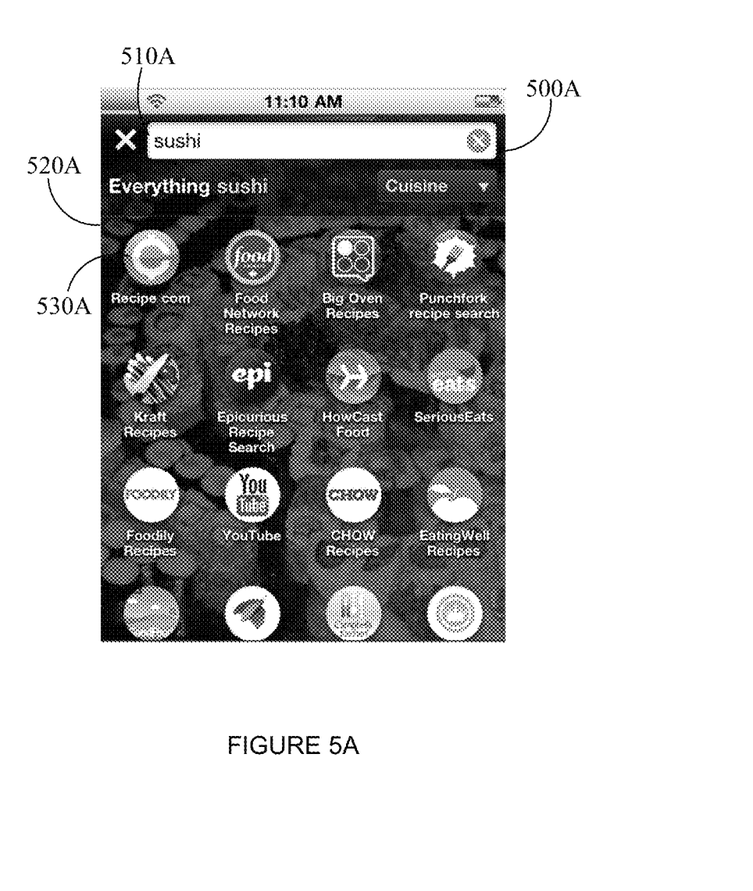
Figure 5B:
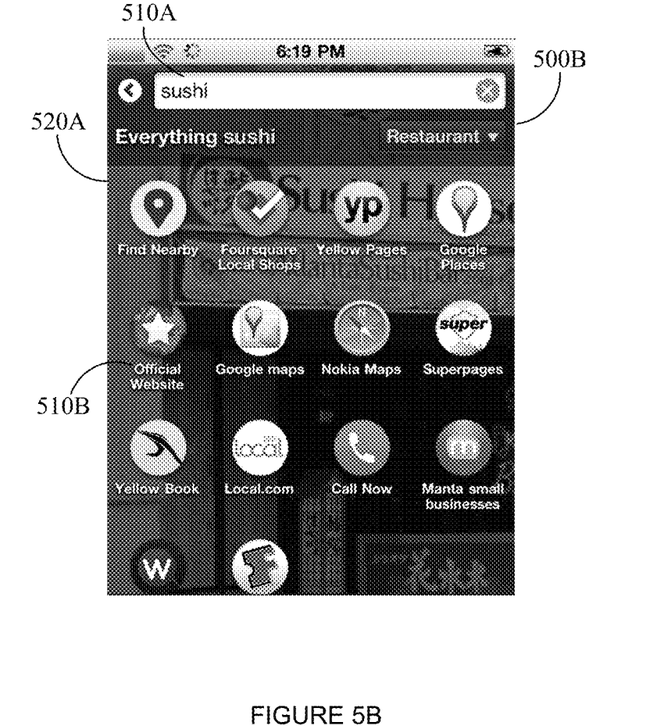

FIGS. 5A and 5B depict exemplary and non-limiting screenshots 500A and 500B of a personalized dynamic home screen of a mobile device. In 500A a default home screen with icons is shown. The user may enter a term, for example, the term query "Sushi" in window 510A. In one embodiment, instant wallpaper with one or more pictures respective of the query intent 520A is provided, as described in further detail in co-pending U.S. patent application Ser. No. 13/296,619 filed on Nov. 15, 2011 to Kasterstein, et al., titled "A SYSTEM AND METHODS THEREOF FOR INSTANTANEOUS UPDATE OF A WALLPAPER RESPONSIVE OF A QUERY INPUT AND RESPONSES THERETO," assigned to common assignee, and which is hereby incorporated by reference for all that it contains.

An environmental variable respective of the user's current location is provided to the search server 120, for example, by the Global Positioning System (GPS). The user's current location is used by the search server 120 to determine whether the user is at his home or away.

Screenshot 500A is a home screen being generated in response to the determination that the user is at his home. Accordingly, as the search server 120 identifies the term "Sushi" it displays a wallpaper related to this intent as well as an icon for displaying results respective for the intent, for example, a resource displaying instructions on how to make sushi at home 530A.

Screenshot 500B is a home screen being generated in response to the determination that the user is away from home, and responsive to the query term "Sushi". The screenshot 500B displays as a result, icons related to the new intent, for example, a link to a website 510B specifying the sushi restaurants near the current location of the user.

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate graphical user interface of an internet mobile application, either generic or tailored for the purposes described in detail hereinabove.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claimed is:

1. A method for dynamically generating and displaying a home screen on a display of a user device, comprising:
   receiving a user query input by a user of the device;
   receiving at least one environmental variable;
   receiving at least one personal variable; and
   determining, by a search server, an intent of a user based on the at least one environmental variable, the at least one personal variable, and the user query;
   selecting by the search server at least one resource of information from a plurality of resources of information respective of at least the intent, wherein the at least one resource is determined by the search server to be most appropriate in fulfilling at least the determined intent, wherein each of the of the at least one selected resource has a representative icon;
generating a new home screen comprising an at least one icon corresponding to the at least one selected resource of information; and
causing the user device to replace a current home screen with the new generated home screen.

2. The method of claim 1, wherein the at least one environmental variable includes at least one of: search history, a time of day, a list of social friends as posted on a social web site, location information, motion information, and weather information.

3. The method of claim 2, wherein the at least one environmental variable is received from at least one of: the user device and external databases.

4. The method of claim 1, wherein the at least one resource of information is at least one of: a search engine, a content provider server, a vertical comparison engine, a content publisher server, and a mobile application installed on the user device.

5. The method of claim 1, wherein the intent of the user represents any one of: a type of content, content, and at least one action that may be of an interest to the user at a current moment.

6. The method of claim 1, wherein selecting the at least one resource of information further comprising:
matching the intent to at least one of: a topic of interest, a key word, and demographic group with which each of the plurality of resources of information is categorized.

7. The method of claim 1, wherein determining the intent further comprising:
analyzing the user query to determine its context;
analyzing each of the received at least one personal variable and at least one environmental variable to determine their respective context;
correlating the received at least one personal variable, the at least one environmental variable and the user query based on their context; and
based on the correlation results deriving at least a category of interest, wherein the category of interest is determined as the intent.

8. The method of claim 7, wherein the user query is at least one of: a keyword, a portion of a keyword, a plurality of keywords, a character, and a series of characters.

9. The method of claim 8, further comprising:
auto completing the user query.

10. The method of claim 1, wherein the at least one icon is any one of: a graphical symbol, a widget, and a gadget that causes to either activate or provide a link to the at least one selected resource of information.

11. A non-transitory computer readable medium having stored thereon instructions for causing one or more processing units to execute the method according to claim 1.

12. An apparatus for dynamically generating and displaying a home screen on a display of a user device, comprising:
an interface to a network to communicate with at least the user device and a plurality of resources of information;
an analyzer configured to dynamically receive at least one environmental variable, at least one personal variable, and a user query, wherein the analyzer is further configured to determine an intent of a user based on the at least one environmental variable, the, at least one personal variable, and the user query;
a selection unit configured to select at least one resource of information from the plurality of resources of information respective of at least the intent, wherein the at least one resource is determined by to be most appropriate in fulfilling at least the determined intent, wherein each of the at least one selected resource has a representative icon; and
an output unit for configured to generate a new home screen including at least one icon corresponding to the at least one selected resource of information, wherein the output unit is further configured to cause the user device to replace a current home screen with the new generated home screen.

13. The apparatus of claim 12, further comprising:
a tracking unit configured to continuously track changes of the at least an environmental variable and update the new generated home screen respective of the changes.

14. The apparatus of claim 12, wherein the at least one environmental variable is received from at least one of the user device and one or more of the plurality of systems.

15. The apparatus of claim 12, wherein the at least one icon is any one of: a graphical symbol, a widget, and a gadget that causes to either activate or provide a link to the at least one selected resource of information.

* * * * *